United States Patent
Bennett

(10) Patent No.: US 6,747,837 B1
(45) Date of Patent: Jun. 8, 2004

(54) DISK DRIVE COMPRISING AN INTEGRATOR FOR CONTROLLING A VCM ACTUATOR AND TRANSFORMER FOR CONTROLLING A PIEZOELECTRIC ACTUATOR

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 312 days.

(21) Appl. No.: 09/945,404

(22) Filed: Aug. 31, 2001

(51) Int. Cl.[7] ............................. G11B 5/55; G11B 5/556
(52) U.S. Cl. ................. 360/78.05; 360/78.12; 360/77.02
(58) Field of Search ................ 360/75, 77.02, 360/78.05, 78.12

(56) References Cited

U.S. PATENT DOCUMENTS

| | | | |
|---|---|---|---|
| 4,722,010 A | * | 1/1988 | Suzuki et al. .................. 360/46 |
| 5,452,275 A | * | 9/1995 | Ogawa ..................... 369/44.11 |
| 6,005,742 A | | 12/1999 | Cunningham et al. |
| 6,069,771 A | | 5/2000 | Boutaghou et al. |
| 6,088,187 A | * | 7/2000 | Takaishi ................... 360/78.05 |
| 6,100,623 A | | 8/2000 | Huang et al. |
| 6,160,676 A | | 12/2000 | Takaishi |
| 6,201,668 B1 | | 3/2001 | Murphy |
| 6,370,039 B1 | * | 4/2002 | Telefus .......................... 363/15 |
| 6,590,734 B1 | * | 7/2003 | Ell ........................... 360/78.05 |

OTHER PUBLICATIONS

STMicroElectronics Specification for L6660, "Milli-Actuator Driver", Dec., 2000, http://www.st.com.
K. Takaishi, T. Imamura, Y. Mizoshita, S. Hasegawa, T. Ueno, and T. Yamada, "Microactuator Control for Disk Drive", IEEE Transactions on Magnetics, vol. 32, No. 3, May 1996.

* cited by examiner

Primary Examiner—David Hudspeth
Assistant Examiner—Jason Olson
(74) Attorney, Agent, or Firm—Milad G. Shara, Esq.; Howard H. Sheerin, Esq.

(57) ABSTRACT

A disk drive is disclosed comprising a voice coil motor (VCM) actuator and a piezoelectric (PZT) actuator. The VCM actuator is driven by a control effort including an integrator, and the PZT actuator is driven by a control effort including a transformer.

6 Claims, 6 Drawing Sheets

DISK DRIVE COMPRISING AN INTEGRATOR FOR CONTROLLING A VCM ACTUATOR AND TRANSFORMER FOR CONTROLLING A PIEZOELECTRIC ACTUATOR

BACKGROUND OF THE INVENTION

1. Field of the Invention

The present invention relates to disk drive. More particularly, the present invention relates to a disk drive comprising an integrator for controlling a VCM actuator and a transformer for controlling a piezoelectric actuator.

2. Description of the Prior Art

A dual stage actuator comprising a primary actuator, such as a voice coil motor (VCM), and a secondary microactuator, such as a piezoelectric (PZT) actuator enables significantly higher tracks-per-inch (tpi) in disk drives. A PZT actuator is a capacitive element that morphs (e.g., bends) proportional to the magnitude of an applied voltage. The morphing action of the PZT element provides a corresponding radial displacement of the head.

A DC-DC converter has been suggested to drive the PZT actuator so that while settling into the tracking mode at the end of seeks the PZT actuator can be decoupled from the primary actuator (the VCM). The driving signal (a voltage) for the PZT actuator is generated separate from the driving signal (a current) for the VCM actuator. The primary actuator is driven with a medium bandwidth loop while the PZT actuator is driven with a high bandwidth loop in response to the PES. In this manner, the PZT actuator is able to compensate for the vibrations inherent in the mechanical components of the primary actuator, as well as the non-linear, hysteretic behavior exhibited by both the pivot bearing and the flex cable. The DC-DC converter facilitates this configuration by generating PZT control voltages over a wide band of frequencies, including low frequencies. However, the DC-DC converter employs switching circuitry which can induce high frequency noise in the read signal. Further, the DC-DC converter generates large DC voltages which must be properly shielded to prevent harmful shocks during installation of the disk drive. The shielding must be approved by UL/CSA/VDE before manufacturing the disk drive, which can add significantly to design cycles and time to market.

There is, therefore, a need for an improved dual stage actuator system for use in a disk drive which avoids the high frequency switching noise and high DC voltages associated with the prior art DC-DC converters for driving PZT actuators.

SUMMARY OF THE INVENTION

The present invention may be regarded as a disk drive comprising a disk, a head, and an actuator for actuating the head radially over the disk, the actuator comprising a voice coil motor (VCM) actuator and a piezoelectric (PZT) actuator. A position error generator generates a position error signal (PES) representing a difference between an actual position of the head and a desired position of the head. The disk drive further comprises a PZT controller comprising a voltage generator for generating a first voltage in response to the PES, and a transformer comprising a primary winding and a secondary winding, the transformer for stepping up the first voltage to generate a second voltage greater than the first voltage, the second voltage applied to the PZT actuator. The disk drive further comprises a VCM controller comprising an integrator for integrating the PES to generate a VCM control signal applied to the VCM actuator in order to force the average of the second voltage toward zero thereby minimizing the volt-second product of the transformer.

In one embodiment, the voltage generator comprises a differentiator for differentiating the PES to generate an input current, a current sensor connected to the primary winding of the transformer for sensing a current in the primary winding, and an amplifier. The amplifier comprises a first input responsive the current sensed in the primary winding, a second input responsive to the input current, and an output for outputting the first voltage. The amplifier drives the current in the primary winding toward the input current to implement a charge driver. In one embodiment, the differentiator comprises a capacitor, and the input current comprises a current flowing through the capacitor.

The present invention may also be regarded as a method for use in a disk drive for actuating a head radially over a disk using a piezoelectric (PZT) actuator and a voice coil motor (VCM) actuator. A position error signal (PES) is generated representing a difference between an actual position of the head and a desired position of the head, and a first voltage is generated in response to the PES. A transformer comprising a primary winding and a secondary winding is used to step-up the first voltage to generate a second voltage greater than the first voltage. The second voltage is applied to the PZT actuator. The PES is integrated to generate a VCM control signal applied to the VCM actuator in order to force the average of the second voltage toward zero thereby minimizing the volt-second product of the transformer.

DESCRIPTION OF THE PREFERRED EMBODIMENTS

Figure 1:
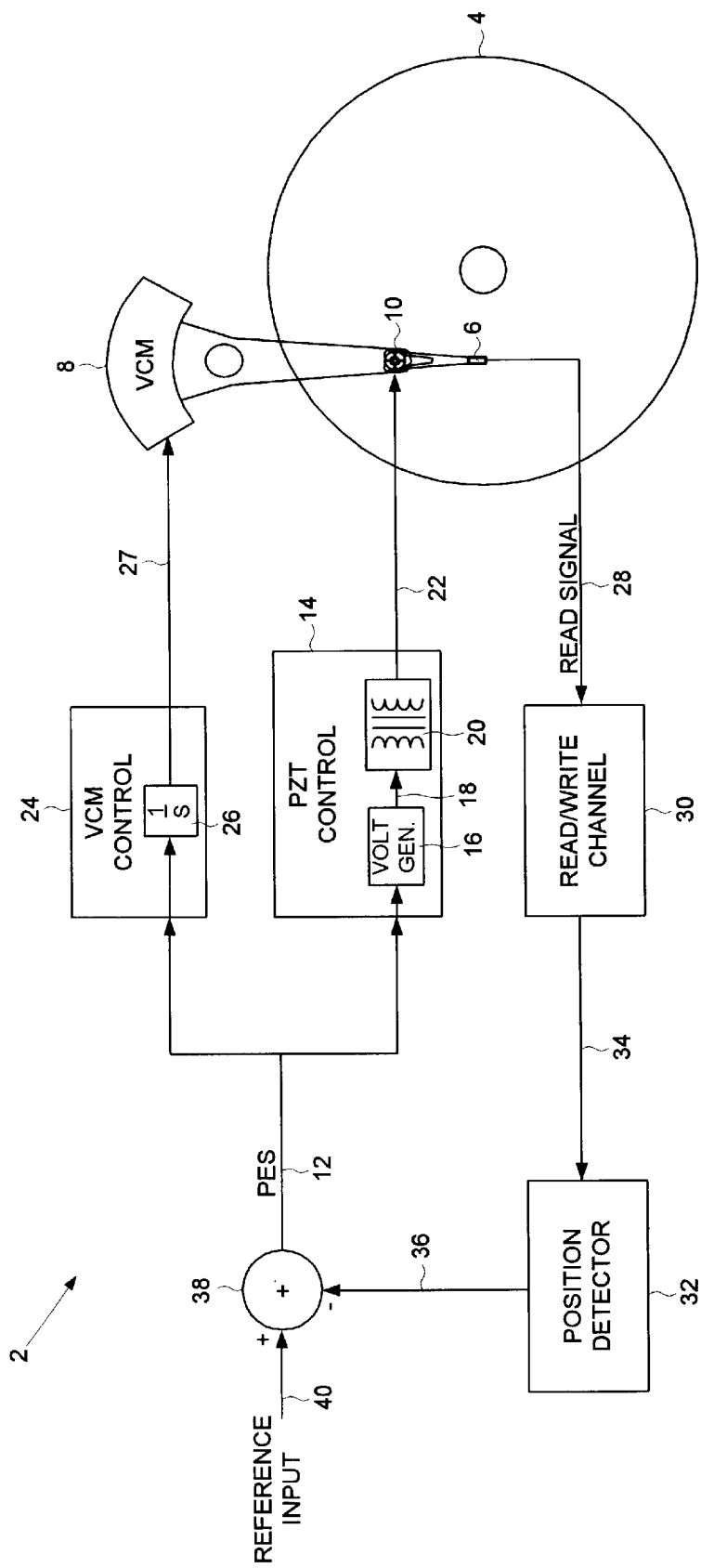
FIG. 1 shows a disk drive according to an embodiment of the present invention comprising a primary VCM actuator driven by a control effort having an integrator, and a secondary PZT micro-actuator driven by a control effort having a transformer. A voltage generator generates an input voltage applied to the transformer to generate a driving voltage applied to the PZT micro-actuator.

FIG. 1 shows a disk drive 2 according to an embodiment of the present invention comprising a disk 4, a head 6, and an actuator for actuating the head 6 radially over the disk 4, the actuator comprising a voice coil motor (VCM) actuator 8 and a piezoelectric (PZT) actuator 10. A position error generator generates a position error signal (PES) 12 representing a difference between an actual position of the head 6 and a desired position of the head 6. The disk drive 2 further comprises a PZT controller 14 comprising a voltage generator 16 for generating a first voltage 18 in response to the PES 12, and a transformer 20 comprising a primary winding and a secondary winding, the transformer 20 for stepping up the first voltage 18 to generate a second voltage 22 greater than the first voltage 18, the second voltage 22 applied to the PZT actuator 10. The disk drive 2 further comprises a VCM controller 24 comprising an integrator 26 for integrating the PES 12 to generate a VCM control signal 26 applied to the VCM actuator 8 in order to force the average of the second voltage 18 toward zero thereby minimizing the volt-second product of the transformer 20.

Any suitable means may be employed in the embodiments of the present invention to generate the PES signal 12. In the embodiment of FIG. 1, the disk 4 comprises a plurality of concentric, radially spaced tracks wherein each track comprises embedded servo sectors recorded at a predetermined interval around the disk 4. Each embedded servo sector comprises a track address for providing a coarse position of the head 6 as well as servo bursts recorded at precise intervals and offsets with respect to the track's centerline for providing a fine position of the head 6. When the head 6 reads an embedded servo sector, a read signal 28 emanating from the head 6 is demodulated by a read/write channel 30 to detect the track address and servo burst information. A position detector 32 processes a signal 34 generated by the read/write channel 30 to compute the actual position 36 of the head 6. An adder 38 subtracts the actual position 36 of the head 6 from a reference input 40 representing the desired position of the head 6 to generate the PES 12.

Figure 2:
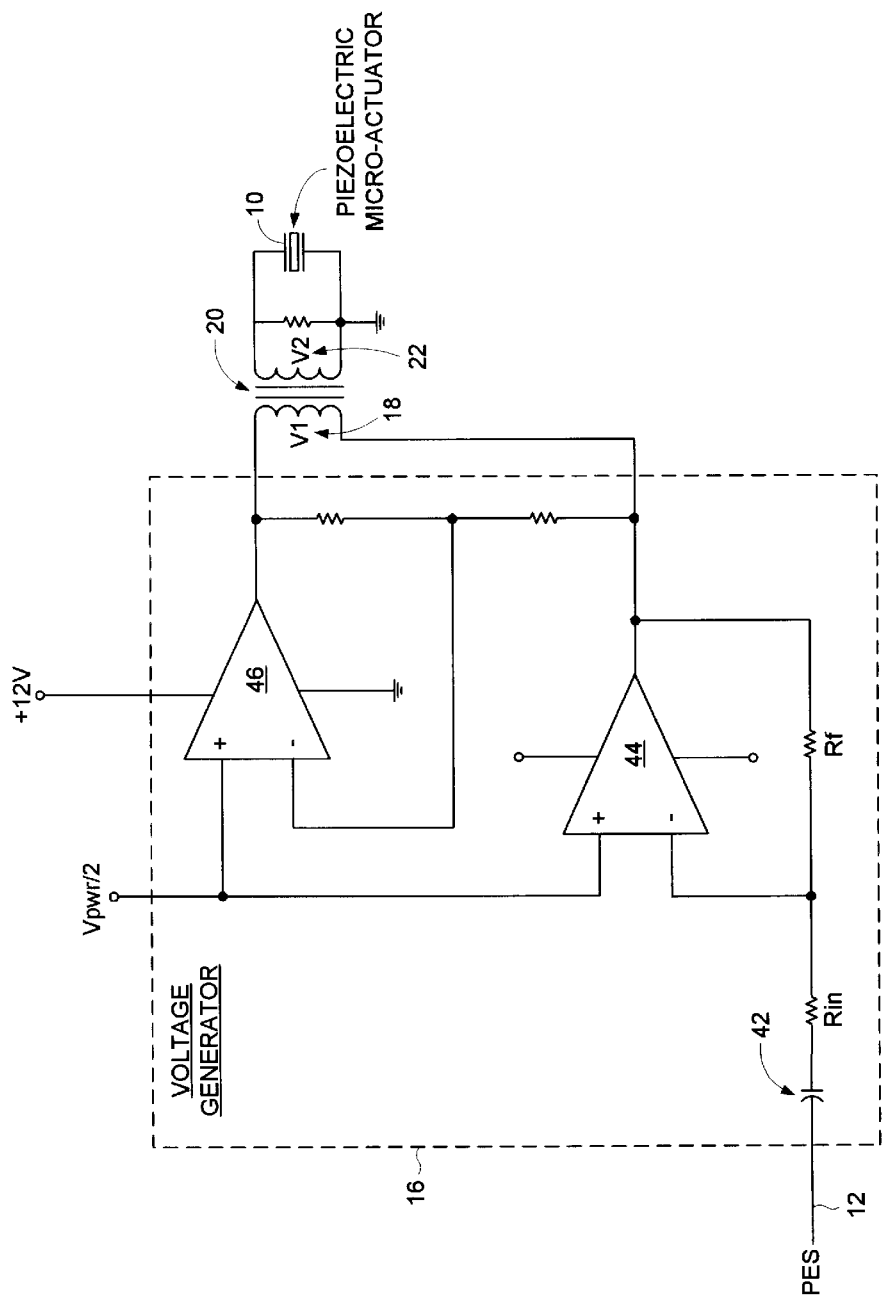
FIG. 2 shows details of a voltage generator according to an embodiment of the present invention for generating the input voltage applied to the transformer in response to a PES A/C coupled through a capacitor.

FIG. 2 shows details of a voltage generator 16 according to an embodiment of the present invention for generating the first voltage 18 applied to the first winding of the transformer 20. The voltage generator 16 comprises a capacitor 42 for A/C coupling the PES 12 to a first amplifier 44. The output of the first amplifier 44 is connected to one end of the first winding in the transformer 20, and the output of a second amplifier 46 is connected to the other end of the first winding. The first and second amplifiers 44 and 46 generate the first voltage 18 in a "push-pull" manner; that is, when the first amplifier 44 generates a positive voltage, the second amplifier 46 generates a negative voltage and vise versa.

Figure 3:
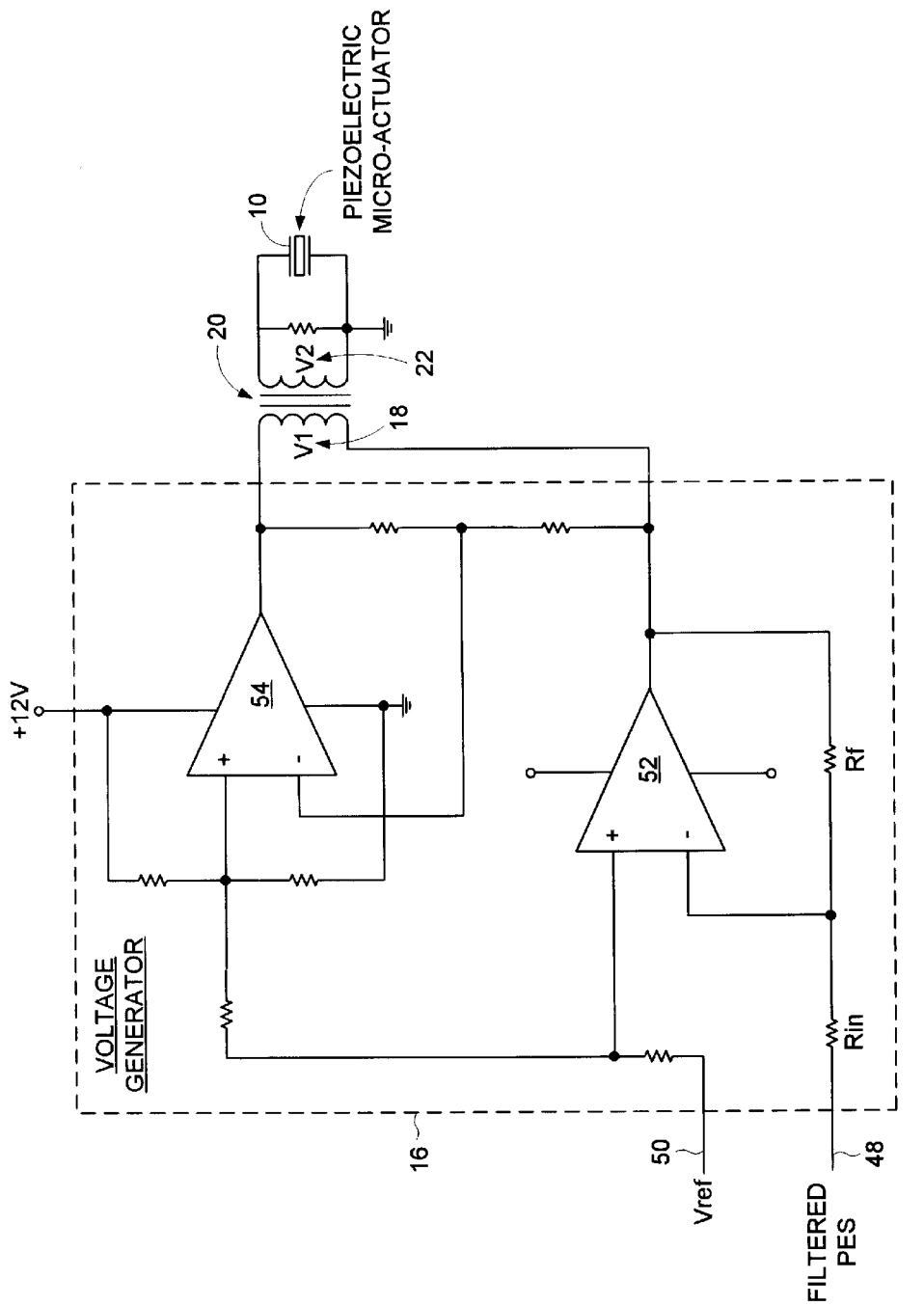
FIG. 3 shows details of a voltage generator according to an embodiment of the present invention for generating the input voltage applied to the transformer in response to a PES A/C coupled through firmware.

FIG. 3 shows details of a voltage generator 16 according to an alternative embodiment of the present invention for generating the first voltage 18 applied to the first winding of the transformer 20. In this embodiment, the PES 12 is A/C coupled to the voltage generator 16 in firmware in order to remove the DC component. The PZT controller 14 comprises a digital low-pass filter for filtering the PES 12 and a digital-to-analog converter (DAC) for converting the filtered PES to generate a filtered PES 48 applied to the voltage generator 16. In the embodiment of FIG. 3, the PZT controller 14 also generates a digital reference voltage converted to an analog reference voltage Vref 50 by the DAC which is applied to amplifiers 52 and 54 of the voltage generator 16.

Figure 4:
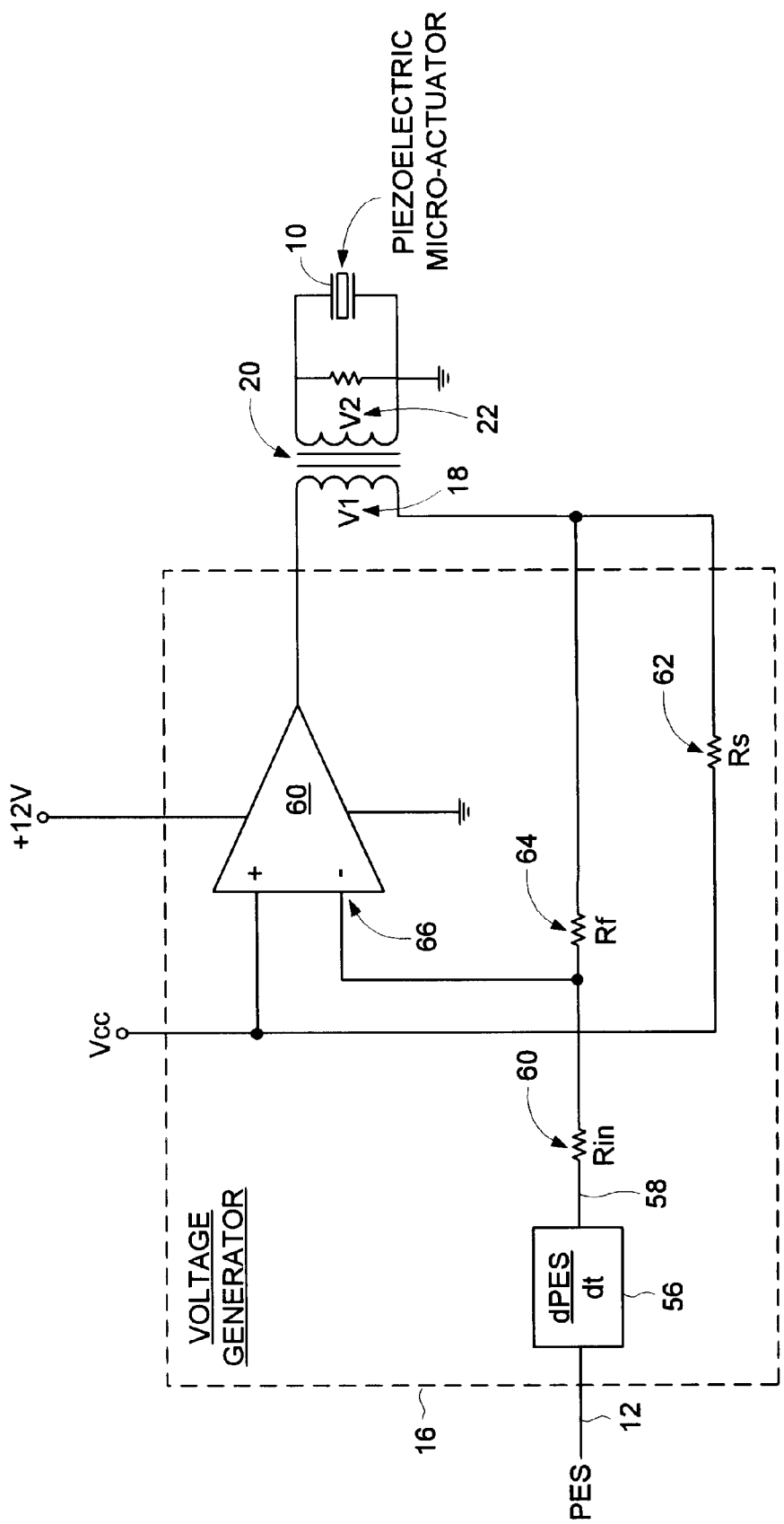
FIG. 4 shows details of a voltage generator according to an embodiment of the present invention comprising a differentiator for differentiating the PES to implement a charge driver.

FIG. 4 shows details of a voltage generator 16 according to yet another embodiment of the present invention for implementing a charge driver in order to compensate for the undesirable non-linear position hysteresis of the PZT actuator 10. The voltage vs position response of the PZT actuator 10 exhibits hysteresis whereas the charge vs position response of the PZT actuator 10 is substantially linear. The voltage generator 16 of FIG. 4 comprises a differentiator 56 for converting the PES 12 into a charge 58 (an input current). The charge 58 travels through Rin 60 to the inverting summing junction of amplifier 60. The amplifier 60 drives the first winding of the transformer 20 until sense resistor Rs 62 develops a sense current through it that is proportional to the input current passing through resistor Rin 60. The current in the primary winding is transferred by the transformer 20 as a voltage to the PZT actuator 10, which by virtue of the PZT actuator impedance becomes a current again. The transformer 20 reflects the impedance of the PZT actuator 10 back to the first winding, thus allowing the amplifier 60 to nullify the impedance by virtue of the very large gain of the amplifier 60 applied to the current loop through sense resistor Rs 62, with feedback through resistor Rf 64. This reflected impedance neutralizes the hystersis of the PZT actuator 10. In one embodiment, the transformer 20 is referenced to a positive voltage to enable bi-directional drive. In another embodiment, the amplifier 60 is chosen so that its output characteristics will drive the transformer 20, while its input impedance at input 66 is very high. In one embodiment, the amplifier 60 is a high-current operational amplifier to enable large step-up ratios.

Figure 5:
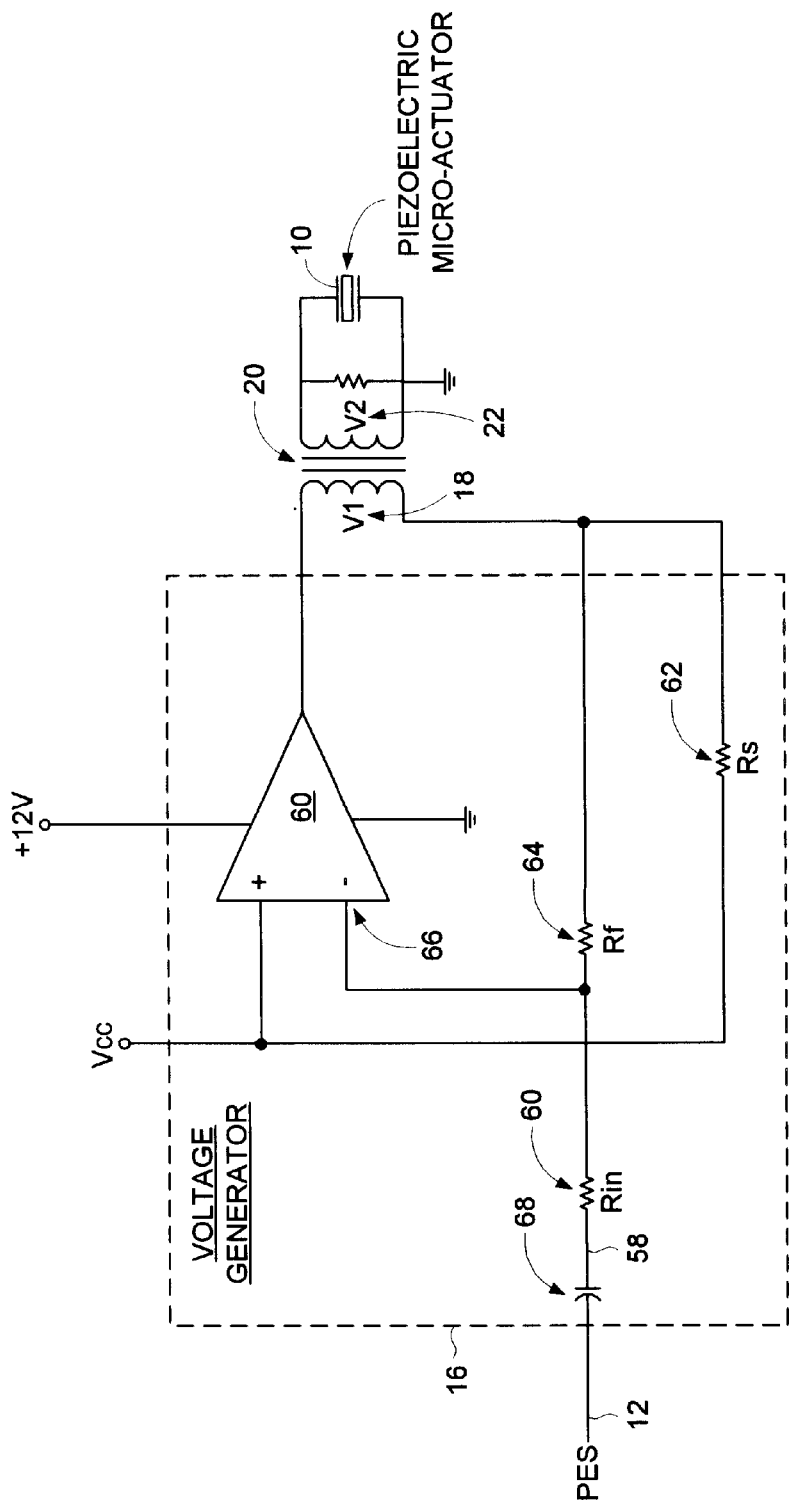
FIG. 5 shows details of a voltage generator according to an embodiment of the present invention for implementing a charge driver wherein the differentiator of FIG. 4 comprises a capacitor.

FIG. 5 shows details of a voltage generator 16 according to an embodiment of the present invention for implementing a charge driver wherein the differentiator 56 of FIG. 4 comprises a capacitor 68.

Figure 6:
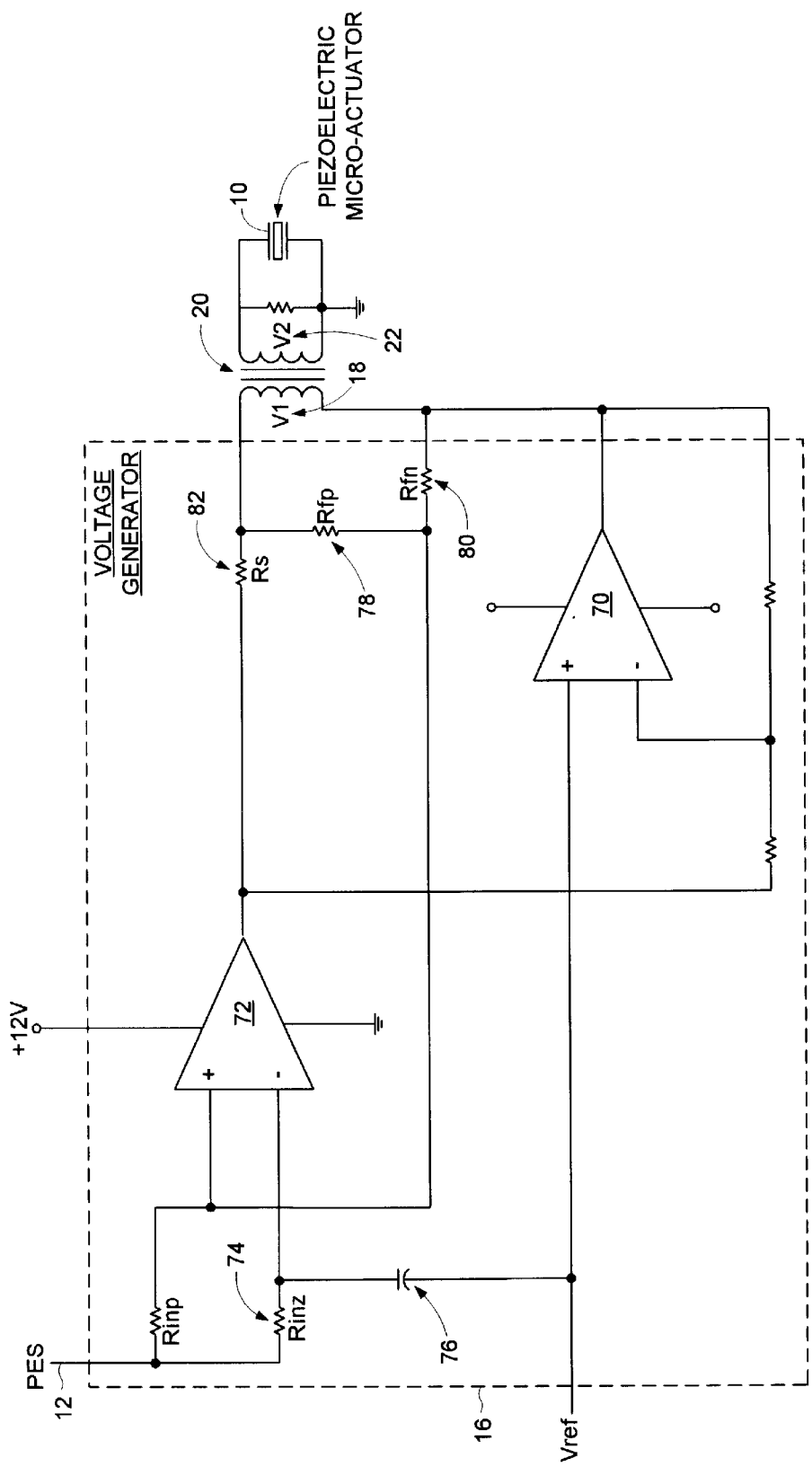
FIG. 6 shows details of a voltage generator according to an embodiment of the present invention for implementing a charge driver using two amplifiers to drive the transformer bidirectionally.

FIG. 6 shows details of a voltage generator 16 according to an embodiment of the present invention for implementing a charge driver comprising two amplifiers 70 and 72. The charge converter is implemented by input resistor Rinz 74 and capacitor 76. Resistors Rfp 78 and Rfn 80 cancel the amplifier output signals and leave only the voltage drop across current sense resistor Rs 82.

In one embodiment, the VCM control 24 is designed taking into account resonances, seek speed requirements, and other standard design considerations. The PZT control 14 is then designed to achieve the highest possible speed, the shortest response time, or the best error correction response. The affect of the integrator 26 in the VCM control 24 is evaluated using a step response to determine the frequency response and damping factor. The volt-second requirement for the transformer 20 in the PZT control 14 is then calculated or determined heuristically by iterating the design of the VCM control 24 until the volt-second requirement is minimized. The PZT control is then evaluated to ensure the motion response does not exceed the maximum available voltage range for allowable input disturbances (disturbance rejection criteria).

The integrator 26 employed in the VCM control effort 24 reduces significantly the volt-second content of the first voltage 18 at low frequencies, thereby allowing the use of a smaller transformer 20 in order to reduce the cost. Further, a smaller transformer 20 improves performance by increasing the high frequency response of the PZT control effort 14.

We claim:
1. A disk drive comprising:
 (a) a disk;
 (b) a head;
 (c) an actuator for actuating the head radially over the disk, the actuator comprising a voice coil motor (VCM) actuator and a piezoelectric (PZT) actuator;
 (d) a position error generator for generating a position error signal (PES) representing a difference between an actual position of the head and a desired position of the head;

(e) a PZT controller comprising:
a voltage generator for generating a first voltage in response to the PES; and
a transformer comprising a primary winding and a secondary winding, the transformer for stepping up the first voltage to generate a second voltage greater than the first voltage, the second voltage applied to the PZT actuator; and (f) a VCM controller comprising an integrator for integrating the PES to generate a VCM control signal applied to the VCM actuator in order to force the average of the second voltage toward zero thereby minimizing the volt-second product of the transformer.

2. The disk drive as recited in claim 1, wherein the voltage generator comprises:

(a) a differentiator for differentiating the PES to generate an input current;

(b) a current sensor connected to the primary winding of the transformer for sensing a current in the primary winding to generate a sensed current; and (c) an amplifier comprising:
a first input responsive the sensed current;
a second input responsive to the input current; and
an output for outputting the first voltage,
whereby the amplifier drives the current in the primary winding toward the input current to implement a charge driver.

3. The disk drive as recited in claim 2, wherein:

(a) the differentiator comprises a capacitor; and (b) the input current comprises a current flowing through the capacitor.

4. A method for use in a disk drive for actuating a head radially over a disk using a piezoelectric (PZT) actuator and a voice coil motor (VCM) actuator, the method comprising the steps of:

(a) generating a position error signal (PES) representing a difference between an actual position of the head and a desired position of the head;

(b) generating a first voltage in response to the PES;

(c) using a transformer comprising a primary winding and a secondary winding to step-up the first voltage to generate a second voltage greater than the first voltage;

(d) applying the second voltage to the PZT actuator; and (e) integrating the PES to generate a VCM control signal applied to the VCM actuator in order to force the average of the second voltage toward zero thereby minimizing the volt-second product of the transformer.

5. The method as recited in claim 4, wherein the step of generating the first voltage comprises the steps of:

(a) differentiating the PES to generate an input current;

(b) sensing a current in the primary winding to generate a sensed current; and (c) amplifying a difference between the sensed current and the input current, thereby driving the current in the primary winding toward the input current to implement a charge driver.

6. The method as recited in claim 5, wherein:

(a) a capacitor differentiates the PES to generate the input current; and (b) the input current comprises a current flowing through the capacitor.

* * * * *